United States Patent [19]

Bubik et al.

[11] 4,146,052

[45] Mar. 27, 1979

[54] DAMPING DEVICE FOR A FLOW OF LIQUID

[75] Inventors: Alfred Bubik, Ravensburg; Hans-Joachim Schultz, Ravensburg-Oberhofen, both of Fed. Rep. of Germany

[73] Assignee: Escher Wyss GmbH, Ravensburg, Fed. Rep. of Germany

[21] Appl. No.: 817,043

[22] Filed: Jul. 19, 1977

[30] Foreign Application Priority Data

Jul. 20, 1976 [CH] Switzerland ..................... 9264/76

[51] Int. Cl.² .................... F16L 55/04; D21F 1/06
[52] U.S. Cl. .................... 137/574; 162/340; 162/343; 162/380
[58] Field of Search ............... 162/343, 380, 340, 216; 137/574

[56] References Cited

U.S. PATENT DOCUMENTS

| 3,373,080 | 3/1968 | Appel et al. | 162/343 |
| 3,400,044 | 9/1968 | Justus | 162/343 |
| 3,725,197 | 4/1973 | Dahl et al. | 162/343 |
| 3,962,031 | 6/1976 | Bubik et al. | 162/343 X |

FOREIGN PATENT DOCUMENTS 158366  3/1957  Sweden ................... 162/380

Primary Examiner—Richard V. Fisher
Attorney, Agent, or Firm—Kenyon & Kenyon, Reilly, Carr & Chapin

[57] ABSTRACT

The damping device has a transition section of increasing cross-sectional area with a perforated plate extending across the downstream end. The perforated plate has ducts which increase in cross-sectional area in a step-wise manner. The transition section may have a parabolic profile, a conical profile, an arcuate profile or may be formed of a sequence of conical parts.

7 Claims, 12 Drawing Figures

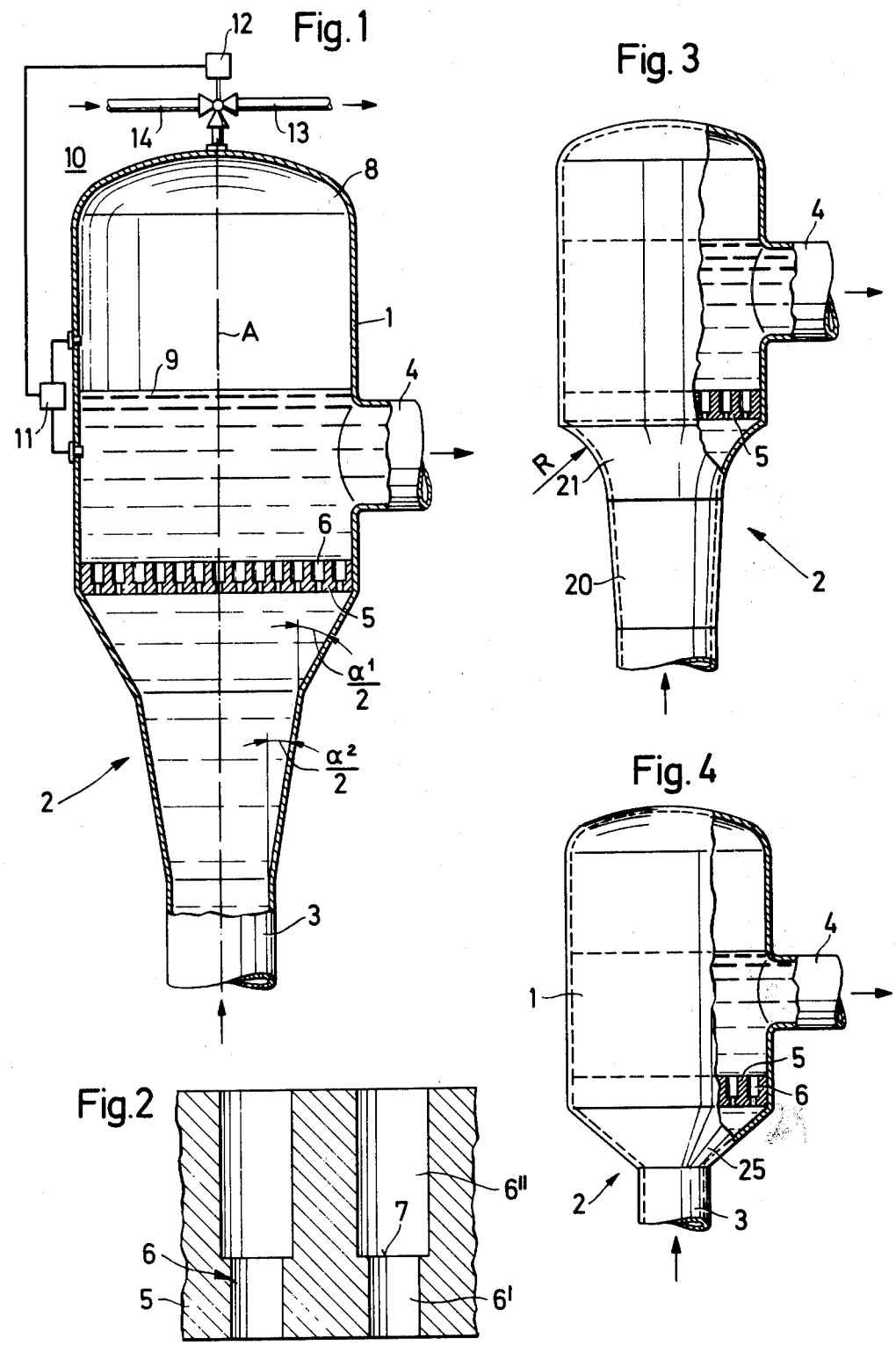

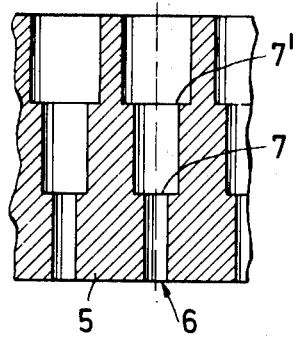
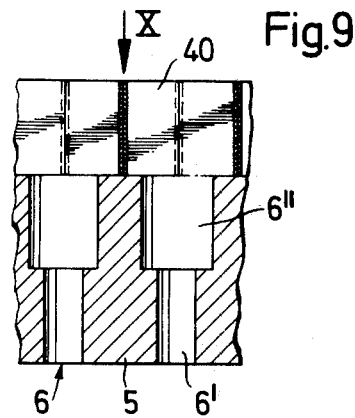
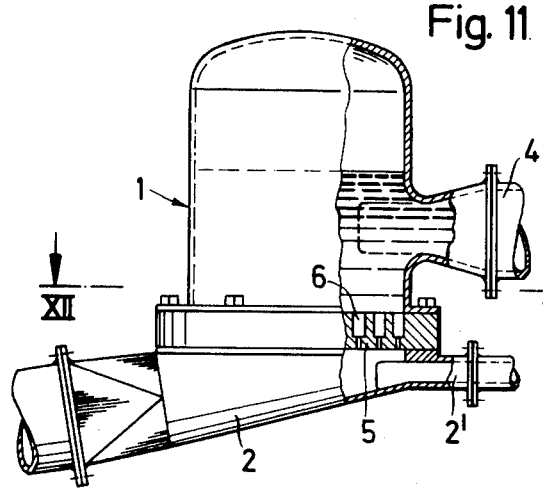
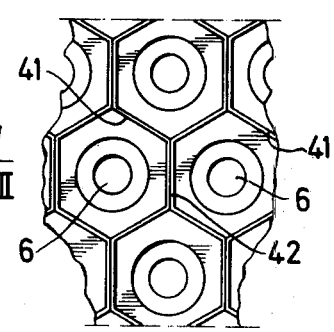
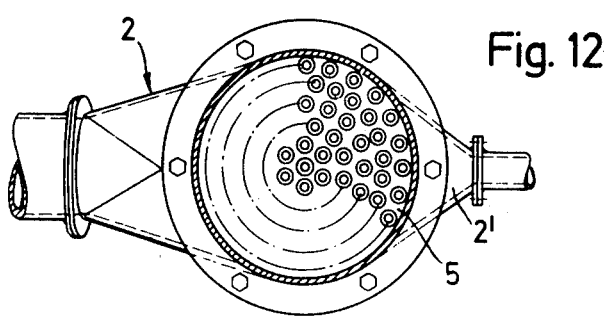

DAMPING DEVICE FOR A FLOW OF LIQUID

This invention relates to a damping device for a flow of liquid and, particularly, a flow of pulp to a head box of a paper making machine.

As is known, various types of devices have been used for damping vibrations in a flow of liquid. In some cases, these devices are constructed in the manner of an expansion chamber. However, the effectiveness of these devices has been very limited. Also, these devices are theoretically suited only for damping a single defined frequency in a very narrow range of the flow volume of the liquid flowing through the device. In other cases, screen diffusors have been used to damp vibrations. In these cases, the diffusers have been formed with a short diffusor section with a screen located at the end of the diffusor section. As compared to a normal diffusor, these screen diffusors have a substantially shorter overall length since the screen permits the use of a larger aperture angle.

It is also known to use step diffusors in the breast boxes of paper making machines, for example, as described in Swiss Pat. No. 518,406 (corresponding to U.S. Pat. No. 3,725,197). Such step diffusors contain flow ducts with flow sections that are enlarged in steps and serve to provide uniform turbulence to the pulp liquid or stock flowing through to a breast box.

It is another object of the invention to provide a damping device which is effective for a wide range of liquid flows.

It is another object of the invention to provide a damping device which permits a large amount of flow throughput while at the same time being effective to damp a broad spectrum of frequencies.

It is another object of the invention to provide a damping device which is particularly suited for use in paper making machines wherein the vibration set up by pumps or unfavorably installed lines have an adverse effect on the formation of a paper web.

It is another object of the invention to provide a damping device which is particularly useful in modern paper making machines with high flow velocities.

Briefly, the invention provides a damping device for a flow of liquid which comprises a housing having a chamber and a transition section of increasing cross-sectional area in the direction of liquid flow to the chamber. In addition, the housing is provided with an inlet line which communicates with the transition section to deliver a flow of liquid and an outlet line which communicates with the chamber above the inlet to exhaust a flow of liquid. Also, the damping device includes a perforated plate within the housing at a downstream end of the transition section relative to a flow of liquid. This plate extends across the entire cross-section of the transition section and has a plurality of ducts, each of which has a series of flow sections of step-wise increasing cross-sectional area in the direction of liquid flow.

A uniform distribution and turbulence of the liquid flow is obtained through the cooperation of the transition section and perforated plate. In this regard, vibrations are damped in a very intensive manner largely independent of their frequency. The perforated plate has an effect similar to that of a screen on the transition section so that the transition section, which expands in the manner of a diffusor, can be very short. The transition section further ensures a very uniform distribution of the flow over the perforated plate.

The perforated plate itself does not only act in a similar manner to the screen of a screen diffusor but also allows a fine and very uniform turbulence of the liquid. In this way, a damping action of the liquid flow is obtained. At the same time, contrary to a screen, the perforated plate can handle a fibrous suspension, such as a pulp suspension of a paper making machine as there is no danger that the fibers can accumulate and form lumps.

In one embodiment, in which the optimum damping effect is produced, the housing is of cylindrical shape and is disposed on a vertical axis while the transition section has the shape of a body of revolution coaxial with the housing. In this case, the perforated plate is horizontally disposed in perpendicular relation to the axis of the housing. However, it is understood that the housing may be of other shapes, such as polygonal cross-section.

The transition section has a parabolic profile to provide the theoretically optimum solution. However, the profile line of the transition section may also be equal to an approximation of a parabolic line if certain losses can be tolerated. Such a transition section is easier to manufacture and renders the overall damping device less expensive.

In order to obtain minimum energy losses, the transition section has an inlet diameter to outlet diameter ratio of at most 1:2. If the diameter ratio between the inlet line and the housing is greater than 1:2, a series of transition sections can be disposed between the inlet line and the chamber with a perforated plate at each downstream end of a respective transition section. In this case, a simple construction may employ a transition section which is conical with a plurality of the perforated plates disposed in tandem therein.

These and other objects and advantages of the invention will become more apparent from the following detailed description and appended claims taken in conjunction with the accompanying drawings in which:

FIG. 1 illustrates a cross-sectional view of a damping device constructed in accordance with the invention.

FIG. 2 illustrates a fragmentary view of a perforated plate according to the invention;

FIG. 3 illustrates a modified damping device in accordance with the invention;

FIG. 4 illustrates a further modified damping device in accordance with the invention;

Figure 7:
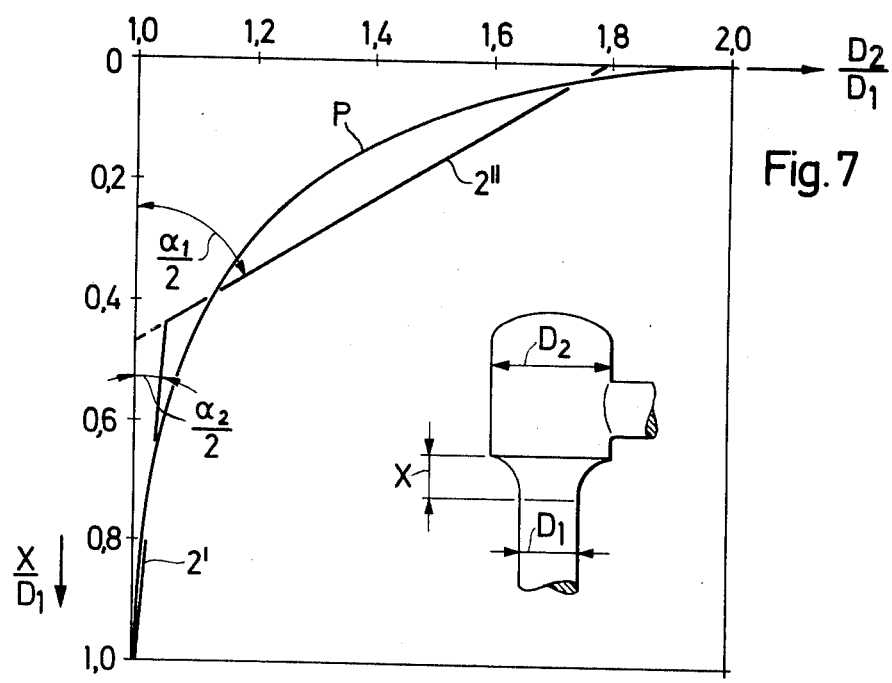

FIG. 7 diagrammatically illustrates the profile shape of a transition section in accordance with the invention;

FIG. 8 illustrates a modified plate in accordance with the invention;

FIG. 9 illustrates a further modification of the perforated plate in accordance with the invention;

FIG. 10 illustrates a view taken in the direction of arrow X of FIG. 9;

FIG. 11 illustrates a partial cross-sectional view of a further modified damping device having an angularly disposed inlet line in accordance with the invention; and FIG. 12 illustrates a view taken on line XII—XII of FIG. 11.

Referring to FIG. 1, the damping device includes a housing 1 which defines a chamber for a liquid and has a transition section 2 of increasing cross-sectional area in the direction of liquid flow to the chamber. In addition, the damping device has an inlet line 3 which communicates with the transition section 2 in order to deliver a flow of liquid and an outlet line 4 which communicates with the chamber above the inlet 3 in order to exhaust a flow of liquid. As shown, the inlet line is integrally connected with the transition section 2 while the outlet line 4 is an integral portion of the housing 1. A perforated plate 5 is disposed within the housing 1 at a downstream end of the transition section 2 relative to the flow of liquid. This plate 5 extends across the entire cross section of the transition section 2 and has a plurality of ducts 6 therein. As shown in FIGS. 1 and 2, each duct 6 has a series of flow sections 6', 6" of step-wise increasing cross-sectional area in the direction of liquid flow. As particularly shown in FIG. 2, a shoulder 7 is disposed between the flow sections 6', 6" of each duct. Each shoulder 7 is formed with a sharp corner but may also be formed in a conical manner with the apex of the cone being located in either of sections 6', 6".

As shown in FIG. 1, the housing 1 is of cylindrical cross section and is disposed on a vertical axis a while the plate 5 is horizontally disposed in perpendicular relation to the axis of the housing.

The transition section 2 is formed of two conical parts, each of which is disposed at different angles; the upper part having an angle $\alpha^{1/2}$ relative to the vertical plane which is greater than the angle $\alpha^{2/2}$ of the lower part.

During use of the damping device, a flow of liquid is fed via the inlet line 3 to the transition section 2. The flow of liquid slows while in the transition section 2 due to the increasing cross section of the transition section 2 and is distributed uniformly over the entire cross-section of the perforated plate 5; the transition section 2 thus acting in the manner of a diffusor. The liquid thereafter flows through the perforated plate 5 into the chamber of the housing 1 to a liquid level 9 above which an air space 8 is maintained. The liquid then flows out of the outlet line 4.

During operation, the damping up of the liquid which occurs at the perforated plate 5, permits the transition section 2 to be shortened considerably relative to a normal diffusor without a perforated plate 5. Thus, the transition section 2 can have substantially steeper aperture angles $\alpha^{1/2}$, $\alpha^{2/2}$. Further, by expanding the cross sections of the flow ducts 6 in the plate 5, a very fine turbulence can be produced in the liquid flow. This allows damping of any vibrations that may occur in the inlet line 3 due, for example, to pumps or improperly laid out lines.

Referring to FIG. 1, in order to obtain the air space 8 above the liquid level 9, use is made of compressed air. For example, a control means 10 is provided which contains a level control 11 and a three way valve 12 which is actuated via the level control 11. As shown, the level control 11 is disposed to sense the height of the liquid within the housing chamber and to actuate the three way valve 12 in response to the height. Depending on the height of the liquid level 9, air is relieved from air space 8 via an exhaust line 13 or compressed air is supplied to the air space 8 via a line 14 from a suitable source (not shown).

The settled liquid in the housing 1 can be supplied via the outlet line 4 to the breast box of a nearby paper making machine. However, the damping device may also be used at other points of a paper making machine as well as in other fields such, for example, in the chemical industry.

Referring to FIG. 3, wherein like reference characters indicate like parts as above, the damping device may be made with a transition section 2 formed of a conical section 20 and a section 21 having the shape of a body of revolution coaxial with the housing, for example, with a profile formed by a circle segment with a radius R. The surface of the section 21 is therefore part of the surface of a toroid. The operation of this damping device is similar to that as described above.

Referring to FIG. 4, wherein like reference characters indicate like parts as above, the transition section 2 may alternatively be formed by a single conical section 25.

Referring to FIG. 7, the optimum shape of the cross-section of the transition section 2 can be determined by the illustrated diagram. As shown, the shape of the profile of the transition section is defined in the ideal form by the curve P and in an approximated form. The diagram represents the ratio of the diameters $D_2/D_1$ in relation to the ratio $X/D_1$; wherein X is the distance of the respective cross-section of the transition section from the end of the transition section. As is evident from FIG. 7, in order to obtain the optimum condition, the diameter ratio $D_2/D_1$ in a transition section of parabolic profile should not exceed 2.0. As also shown, the approximate shape of the profile line of the transition section corresponds to the embodiment illustrated in FIG. 1 having two conical sections 2', 2".

Figure 5:
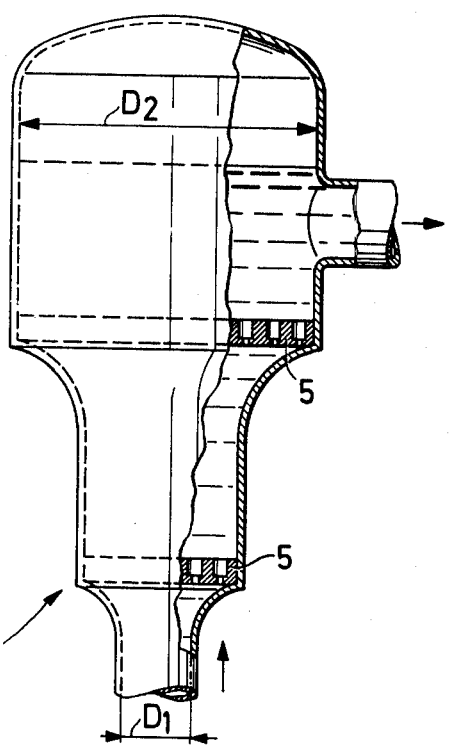
FIG. 5 illustrates a view of a damping device employing a pair of transition sections in accordance with the invention.

Referring to FIG. 5, wherein like reference characters indicate like parts as above, in order to obtain favorable conditions wherein the ratio of the diameters of the inlet of the transition section ($D_1$) to the outlet diameter ($D_2$), which diameter also represents the diameter of the housing chamber, is larger than 2.0, two transition sections 2 are arranged in tandem. In this case, a perforated plate 5 is located at the downstream end of each of the transition sections. By subdivision, the ratio of the inlet cross-section to the outlet cross-section of each transition section 2 is not larger than 2.0.

Figure 6:
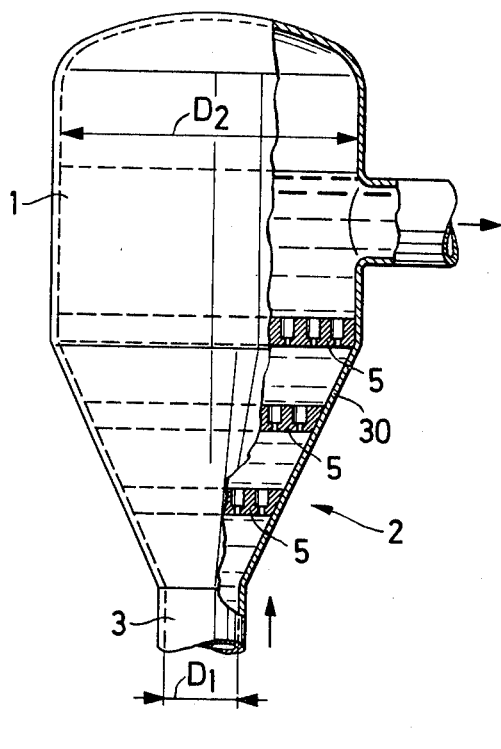
FIG. 6 illustrates a view of a modified damping device employing a conical transition section with a series of perforated plates therein in accordance with the invention.

Referring to FIG. 6, in order to simplify the construction of the damping device for conditions where the housing diameter $D_2$ is more than twice as large as the diameter $D_1$ of the inlet line 3, the transition section 2 is formed by a cone 30 in which several perforated plates 5 are located in tandem with respect to the flow direction. As above, these plates 5 are perpendicular to the axis of the inlet line 3 and the housing 1. In addition, the plates 5 are arranged at such distances from each other that the ratio of the diameters of adjacent perforated plates or sections defined thereby is smaller than 2.0. Thus, the conditions illustrated in FIG. 7 are met.

Referring to FIG. 8, each perforated plate 5 described above may be formed with flow ducts 6 which have three consecutively disposed flow sections with a shoulder 7, 7' between each two flow sections. Alternatively, as shown in FIG. 9, each plate 5 may be provided with a honeycomb grid 40 at the downstream side. This honeycomb grid 40, as shown in FIG. 10, is shaped so that each flow duct 6 communicates with a chamber defined by the grid 40. The grid 40 may be constructed of sheet metal strips 41 which are bent in a wave form or which may be soldered together at respective points 42.

Referring to FIGS. 11 and 12, the damping device may alternatively be constructed for cases where a low overall height is required. In such a case, the transition section 2 is disposed obliquely such that the liquid flows against the perforated plate 5 at an angle. In order to prevent the formation of lumps of fibers which may form in a pulp suspension being delivered to a paper making machine, a return line 2' is provided which leads back to the source of the pulp liquid. Otherwise, the operation of this modified damping device is the same as the previously described embodiments.

What is claimed is:

1. A damping device for a flow of liquid comprising
a cylindrical housing disposed on a vertical axis and defining a chamber, said housing having at least one transition section of increasing cross-sectional area in the direction of liquid flow to said chamber, said transition section having the shape of a body of revolution coaxial with said housing,
an inlet line communicating with said transition section to deliver a flow of liquid thereto;
an outlet line communicating with said chamber above said inlet line to exhaust a flow of liquid therefrom; and
a horizontal perforated plate disposed in perpendicular relation to said axis within said housing at a downstream end of said transition section relative to a flow of liquid, said plate extending across the entire cross-section of said transition section and having a plurality of ducts therein, each said duct having a series of flow sections of step-wise increasing cross-sectional area in the direction of liquid flow.

2. A damping device as set forth in claim 1 wherein said transition section has a parabolic profile.

3. A damping device as set forth in claim 1 wherein said transition section has a profile line equal to an approximation of a parabolic line.

4. A damping device as set forth in claim 1 wherein said transition section has an inlet diameter ($D_1$) to outlet diameter ($D_2$) ratio of at most 1:2.

5. A damping device as set forth in claim 1 wherein said housing has a series of said transition sections between said inlet line and said chamber and a respective perforated plate at each downstream end of a respective transition section.

6. A damping device as set forth in claim 1 wherein said transition section is conical and which further comprises a plurality of perforated plates disposed in tandem therein, each said plate of said plurality extending across the entire cross-section of said transition section and having a plurality of ducts therein, each said duct having a series of flow sections of step-wise increasing cross-sectional area in the direction of liquid flow.

7. A damping device for a flow of liquid comprising
a cylindrical housing disposed on a vertical axis and defining a chamber, said housing having a transition section of increasing cross-sectional area in the direction of liquid flow to said chamber, said transition section being disposed obliquely to said housing chamber;
an inlet line communicating with said transition section to deliver a flow of liquid thereto;
an outlet line communicating with said chamber above said inlet line to exhaust a flow of liquid therefrom; and
a horizontal perforated plate disposed in perpendicular relation to said axis within said housing at a downstream end of said transition section relative to a flow of liquid, said plate extending across the entire cross-section of said transition section and having a plurality of ducts therein, each said duct having a series of flow sections of step-wise increasing cross-sectional area in the direction of liquid flow.

* * * * *